(12) United States Patent
Benari (10) Patent No.: US 8,650,559 B2
(45) Date of Patent: Feb. 11, 2014

(54) AUTOMATIC REMOTE INSTALLATION OF A VIRTUALIZATION HOST

(75) Inventor: Amos Benari, Yokneam Hamoshava (IL)

(73) Assignee: Red Hat Israel, Ltd., Raanana (IL)

( * ) Notice: Subject to any disclaimer, the term of this patent is extended or adjusted under 35 U.S.C. 154(b) by 999 days.

(21) Appl. No.: 12/549,255

(22) Filed: Aug. 27, 2009

(65) Prior Publication Data

US 2011/0055824 A1    Mar. 3, 2011

(51) Int. Cl.
*G06F 9/44*    (2006.01)

(52) U.S. Cl.
USPC ............................................ 717/176; 709/220

(58) Field of Classification Search
None
See application file for complete search history.

(56) References Cited

U.S. PATENT DOCUMENTS

| | | | | |
|---|---|---|---|---|
| 6,560,236 | B1 * | 5/2003 | Varghese et al. | 370/401 |
| 8,176,168 | B1 * | 5/2012 | Ramamurthy | 709/224 |
| 2004/0210623 | A1 * | 10/2004 | Hydrie et al. | 709/201 |
| 2008/0163207 | A1 * | 7/2008 | Reumann et al. | 718/1 |
| 2009/0282359 | A1 * | 11/2009 | Saul et al. | 715/784 |
| 2010/0232443 | A1 * | 9/2010 | Pandey | 370/401 |

OTHER PUBLICATIONS

Andrew S. Tanenbaum, Structured Computer Organization, 1984, Prentice-Hall Inc., Second Edition, pp. 10-11.*
"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

*Primary Examiner* — Elias Mamo
(74) *Attorney, Agent, or Firm* — Lowenstein Sandler LLP (57) ABSTRACT

Techniques for automatic remote installation of a virtualization host are described herein. A logical network is configured at a management server to be associated with a network interface card (NIC) of a remote host, where the logical network is identified by a network identifier. The management server installs a software bridge within the remote host, where the software bridge is associated with a bridge identifier that is identical to the network identifier. The software bridge is configured to allow a plurality of virtual machines (VMs) hosted by the remote host to access the logical network via the NIC of the remote host.

18 Claims, 5 Drawing Sheets

AUTOMATIC REMOTE INSTALLATION OF A VIRTUALIZATION HOST

TECHNICAL FIELD

Embodiments of the present invention relates generally to virtual machines. More particularly, embodiments relate to techniques for automatic remote installation of a virtualization host.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

The virtualization technologies have wide applications in the computer field with the development of computer systems. For example, such virtualization technologies can be used to implement a virtual desktop application which runs within a virtual machine and can be accessed from a client over a network, such as, for example, SolidICE™ available from Red Hat, Inc. of Raleigh, N.C.

Typically, when a host that hosts one or more VMs is configured, for example, by an administrator, the remote installation (e.g., bridge configuration) of the host is a manual process. For a large amount of hosts to be configured, this manual process can be cumbersome and error prone.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for automatic remote installation of a host are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, in order to remotely install a virtualization host, an administrator typically has to manually set up certain parameters for certain components such as setting up a bridge of the host. For a large amount of hosts to be installed, this manual process can be cumbersome and error prone.

According to one embodiment, after setting up a network (e.g., physical or logical network) for a particular network interface of a remote host to be installed, a bridge (e.g., software bridge) of the remote host is automatically configured using certain parameters of the network associated with the particular network interface. For example, when a network is configured (e.g., automatically or manually by an administrator) and assigned by a network identifier (e.g., network name), a software bridge is automatically created within the remote host and assigned by a bridge identifier that matches the network identifier. Thereafter, one or more virtual machines (VMs) that are hosted by the remote host are communicatively coupled to the software bridge and enabled to access the network via the physical network interface (e.g., network interface card or NIC) of the remote host. As a result, the installation of the bridge can be automatically processed. In addition, since the bridge is identified by the same identifier as a network, all VMs coupled to the bridge can communicate with each other, as well as access the external network via a physical NIC, which logically represents a "big network" identified by the same identifier for easy management.

Figure 1:
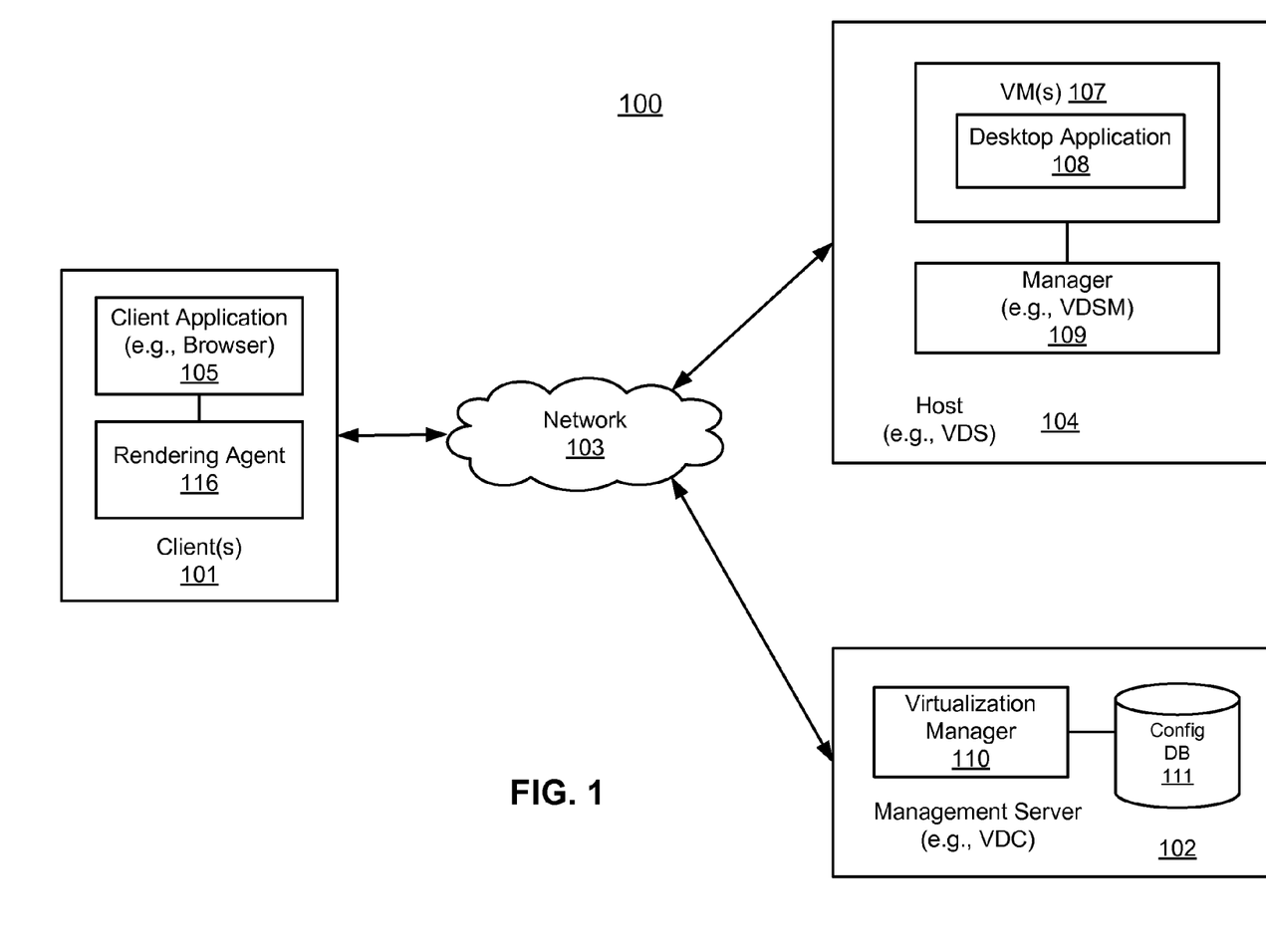
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Each server 104 may represent an independent machine. Network 103 may be a local area network (LAN) or a wide area network (WAN), and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 107, each having one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be managed by a management server 102. For example, in a graphics remoting application, host server 104 may be implemented as a VDS (that may be an independent machine or part of the machine hosting server 104) server while management server 102 may be implemented as a VDC (virtual desktop control) server. Host 104 is configured and certain software components are remotely installed via virtualization manager 110 of management server 102. The virtualization manager 110 is configured to communicate with manager 109 (e.g., VDSM) for remote installation at host 104. The configuration information is stored in configuration database 111.

Figure 3:
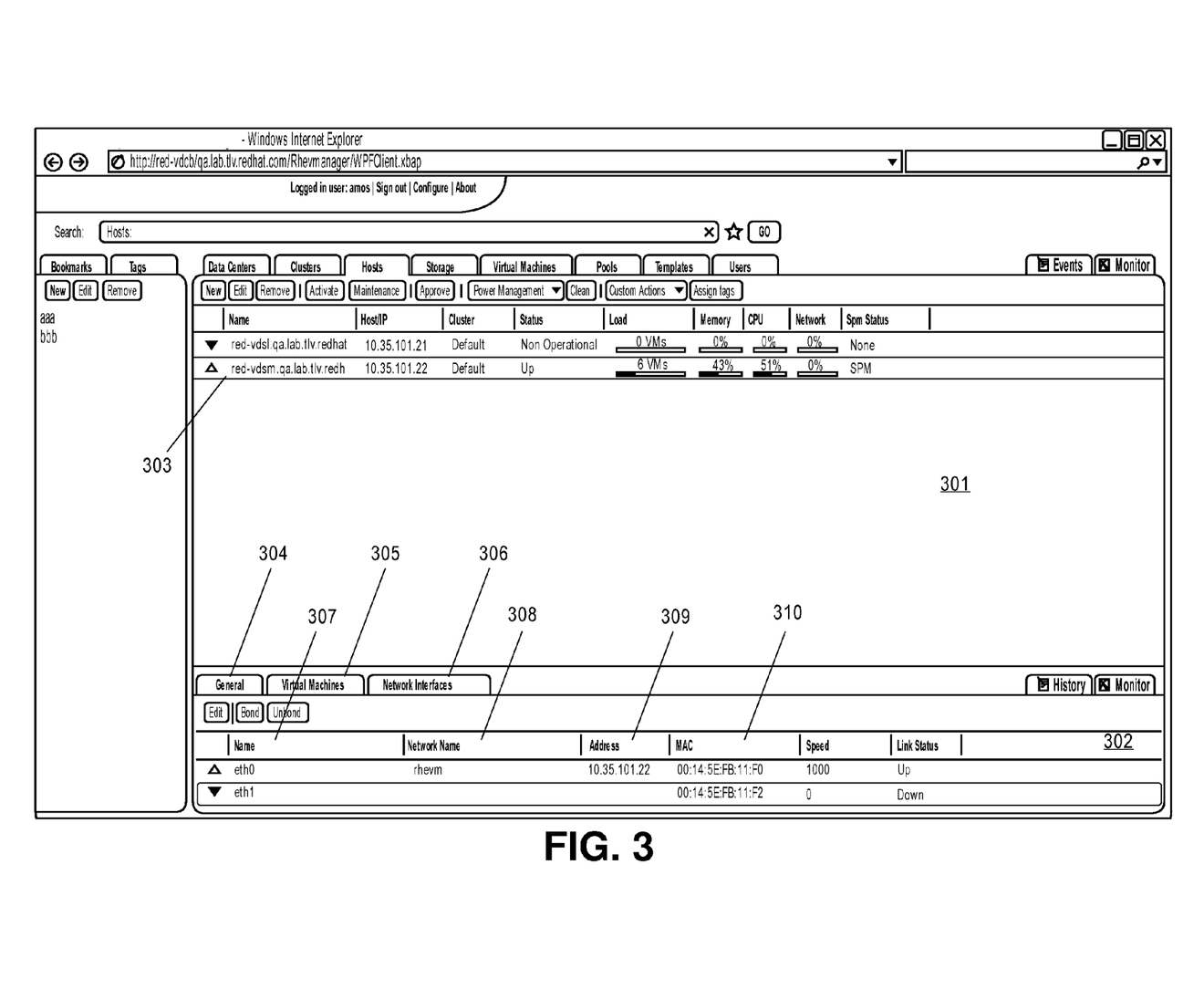
FIG. 3 is screenshots for configuring a network interface of a host according to one embodiment.

For example, a NIC of host 104 can be configured by virtualization manager 110 to be attached to network 103 which may be a physical or logical network identified by a network identifier via a graphical user interface (GUI) such as the one shown in FIG. 3. According to one embodiment, after setting up a network for a particular network interface of host 104, a bridge of the remote host 104 is automatically installed and configured using certain parameters of the network associated with the NIC. For example, when a network is configured and assigned by a network identifier (e.g., network name), a software bridge is automatically created within host 104 and assigned by a bridge identifier that matches the network identifier. Thereafter, one or more VMs 107 that are hosted by host 104 are communicatively coupled to the software bridge and enabled to access each other and network 103 via the physical network interface of host 104. As a result, the installation of the bridge can be automatically processed.

Figure 2:
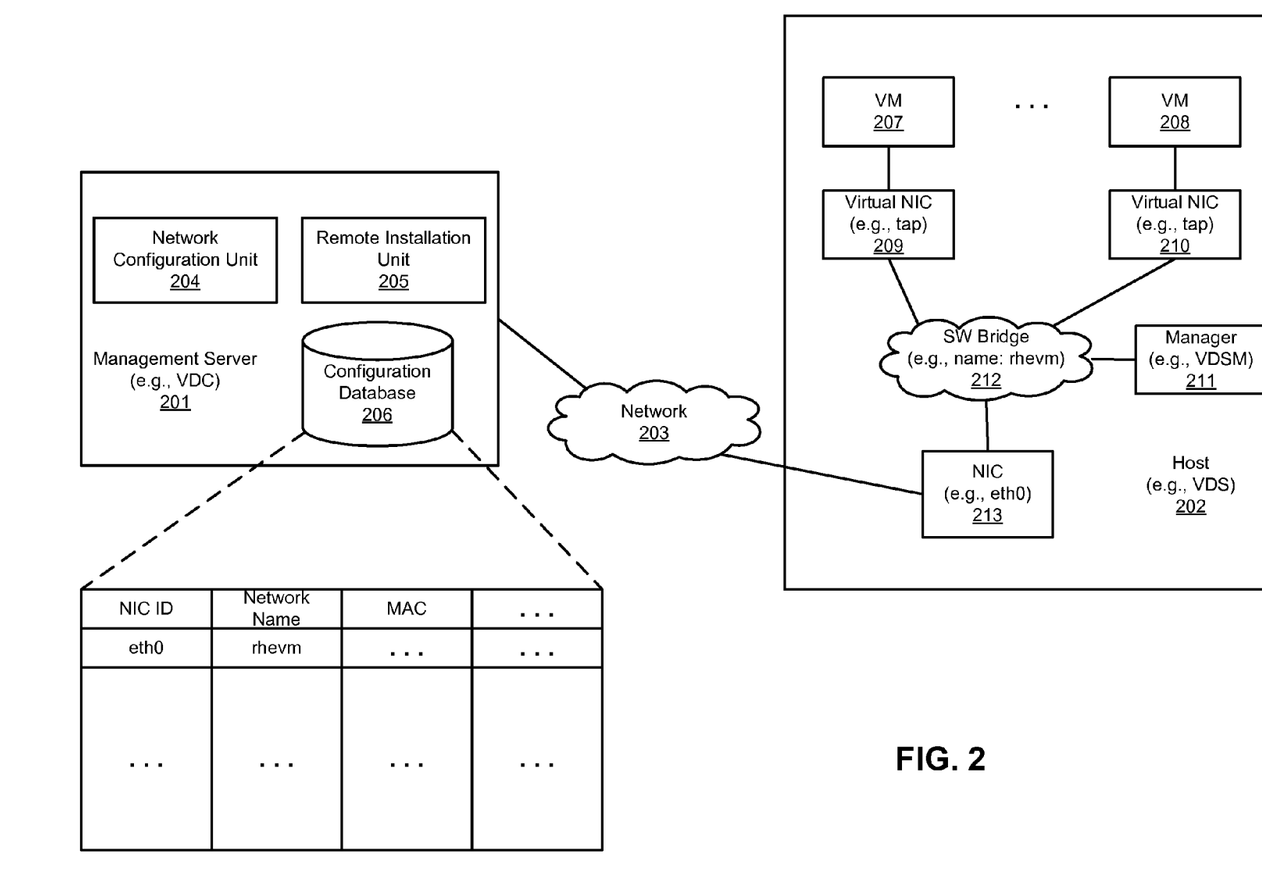
FIG. 2 is a block diagram illustrating an example of a network configuration according to another embodiment.

FIG. 2 is a block diagram illustrating an example of a network configuration according to an alternative embodiment of the invention. For example, host 202 may be implemented as part of a cluster associated with host 104 (e.g., VDS) and server 201 may be implemented as part of server 102 (e.g., VDC) of FIG. 1. Network 203 may be implemented as part of network 103. Referring to FIG. 2, management server 201 is communicatively coupled to host 202 over network 203, which may be a physical network or a logical network. Management server 201 includes a network configuration unit 204, a remote installation unit 205, and a configuration database 206. Network configuration unit 204 and/or remote installation unit 205 may be implemented as part of virtualization manager 110 of FIG. 1.

According to one embodiment, network configuration unit 204 is operable to configure a network interface of a remote host, such as NIC 213 of host 202. NIC 213 may be configured to be associated with a network or a network segment. The network or network segment may be identified by a network identifier (e.g., network name), which may be specified via a graphical user interface (GUI) provided from management server 201 such as the one as shown in FIG. 3. The configuration information or parameters may be stored in database 206.

In this example, network configuration unit 204 is used to configure NIC 213 of host 202 by associating NIC 213 with a network named "rhevm", including specifying other parameters such as MAC (media access control) address of NIC 213 as shown in FIG. 3. Once the network has been identified and associated with NIC 213, remote installation unit 205 communicates with manager 211 (e.g., VDSM) of host 202 to automatically install a software bridge 212 using a bridge identifier that matches the network identifier associated with NIC 213 (e.g., "rhevm"). In addition, for each of VMs 207-208, a virtual NIC device (e.g., virtual NICs 209-210) is set up to allow a respective VM to access network 203 via bridge 212 and NIC 213. VMs 207-208 can also communicate with each other via bridge 212.

A bridge is a way to connect two Ethernet segments together in a protocol independent way. Packets are forwarded based on Ethernet address, rather than IP address (like a router). Since forwarding is done at layer 2, all protocols can go transparently through a bridge. That is, a bridge connects two or more physical networks together to form one bigger (logical) network.

In a Linux operating environment, for the purpose of illustration, remote installation unit 205 causes a sequence of commands to be automatically executed at host 202 to set up bridge 212 and virtual NICs 209-210:

brctl addbr rhevm
brctl addif rhevm eth0
brctl addif rhevm tap0
brctl addif rhevm tap1
ifconfig rhevm up It is assumed that there are only two VMs hosted by host 202 in this example. The first command is configured to create a bridge named "rhevm", which matches the network identifier associated with network interface device "eth0" (e.g., NIC 213) automatically provided by network configuration unit 204 and/or remote installation unit 205. The next three commands are configured to add three network interfaces to the bridge: "eth0" (e.g., NIC 213), "tap0" (e.g., VNIC 209), and "tap1" (e.g., VNIC 210). The last command is configured to activate the bridge. As a result, the bridge named "rhevm" transparently forwards packets among interfaces of "eth0", "tap0", and "tap 1."

A tap device provides packet reception and transmission for user space programs. It can be viewed as a simple Ethernet device, which instead of receiving packets from a physical media, receives them from a user program and instead of sending packets via a physical media, writes to a user space program. That is, a tap device is a virtual network interface device for a VM in this example.

When a software bridge is set up, each of the VMs can be configured to use a specific "network" (i.e., a software bridge) by grouping them together so that they can "see" each other in the same group. For example, there can be one network of "sale" and one network of "HR", where VMs associated with "sale" are configured in the same sub-domain and can communicate with each other (e.g., network file sharing, etc.) Note that some or all of the components as shown in FIG. 2 may be implemented in software, hardware, or a combination of both.

FIG. 3 is a screenshot representing a GUI of a virtualization management system according to one embodiment. For example, the GUI as shown in FIG. 3 may be presented by virtualization manager 110 of FIG. 1 and accessed by an administrator for configuring and/or managing hosts and the VMs hosted therein. Referring to FIG. 3, when an administrator accesses a user interface of a virtualization management system such as management server 102 of FIG. 1, a GUI page similar to the one as shown in FIG. 3 is presented. Such a GUI page may be presented via a Web interface and accessed using a Web browser. From the GUI of FIG. 3, a variety of elements of a virtualization system can be configured and managed, such as, for example, a data center, cluster, hosts, storage, virtual machines, etc.

In this example, when a user selects a host tab, one or more hosts of of a particular cluster of a particular data center can be displayed in display area 301. For each selected host such as host 303, the configurations of one or more components associated with the selected host 303 can be displayed in display area 302. Through display area 302, a variety of parameters or attributes associated with the selected host 303 can be displayed and configured, such as, for example, general parameters 304, virtual machines 305, and network interfaces 306. In this example, when a user selects network interface tab 306, one or more network interface devices are displayed in displayed area 302. For each network interface device displayed, certain configuration parameters of the respective network interface device, such as, for example, a device name 307, a logical network/physical network name 308, network address (e.g., IP address) 309, and media access control (MAC) address 310 can be configured. For example, when a network name "rhevm" is configured in network name field 308, a software bridge having an identifier matching the network name is automatically installed at the selected host using the techniques described throughout this application.

Figure 4:
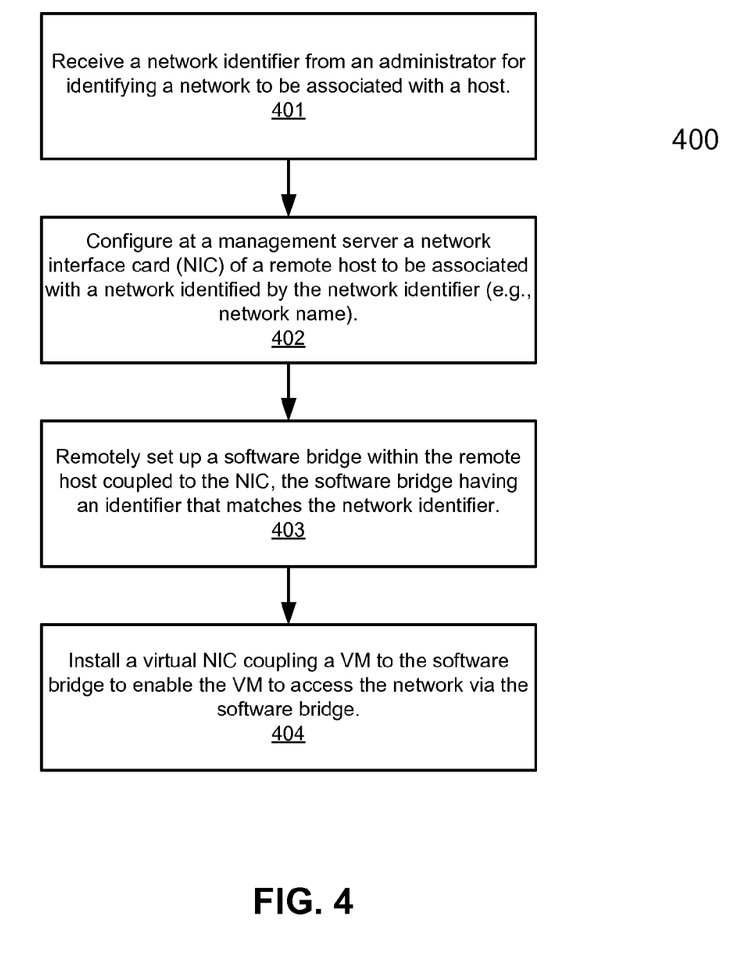
FIG. 4 is a flow diagram illustrating a method for automatic remote installation of a host according to another embodiment.

FIG. 4 is a flow diagram illustrating a method for automatically configuring a network interface of a host according to one embodiment. Note that method 400 may be performed by processing logic which may include software, hardware, or a combination of both. For example, method 400 may be performed by management server 201 of FIG. 2. Referring to FIG. 4, at block 401, a network identifier is received (e.g., at a management server) from an administrator for identifying a network (e.g., logical network) to be associated with a network interface (e.g., NIC) of a host, which is to be remotely installed. For example, the network identifier may be specified by an administrator via a GUI as shown in FIG. 3. In response, at block 402, the corresponding network interface of the host is configured to be associated with a network identified by the network identifier. In addition, at block 403, a software bridge is automatically installed at the remote host, where the software bridge is configured to be identified by a bridge identifier identical to the network identifier. At block 404, a virtual network interface device associated with a VM is automatically installed to be coupled to the software bridge to enable the VM to access the network via the software bridge. Other operations may also be performed.

Figure 5:
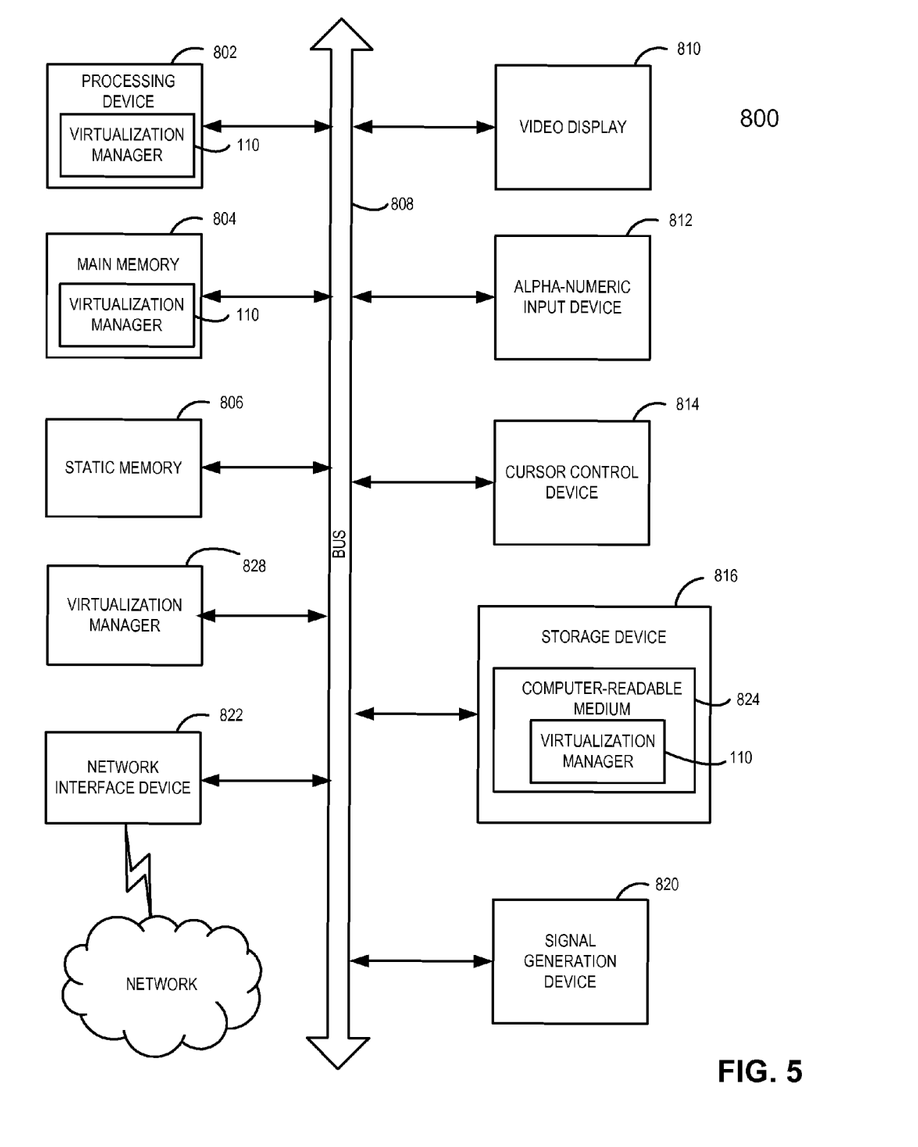
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 110 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., virtualization manager 110) embodying any one or more of the methodologies or functions described herein. The virtualization manager 110 may also reside, completely or at least partially, within the main memory 804 and/or within the processing device 802 during execution thereof by the computer system 800, the main memory 804 and the processing device 802 also constituting machine-accessible storage media. The virtualization manager 110 may further be transmitted or received over a network via the network interface device 822.

The computer-readable storage medium 824 may also be used to store the virtualization manager 110 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Thus, techniques for automatic remote installation of a host have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring" or "installing" or "attaching" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated, configured, or installed by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   configuring, at a management server, a logical network to be associated with a network interface card (NIC) of a remote host, wherein configuring the logical network comprises assigning a network identifier to the logical network;
   upon configuring the logical network, installing, by the management server, a software bridge within the remote host;
   assigning, by the management server, to the software bridge a bridge identifier that is identical to the network identifier; and
   causing a plurality of virtual machines (VMs) hosted by the remote host to be communicatively coupled to the software bridge to access the logical network via the NIC of the remote host.

2. The method of claim 1, wherein the NIC of the remote host is coupled to the software bridge as a bridge interface, wherein the NIC is a physical network interface device.

3. The method of claim 2, further comprising for each of the VMs coupled to the software bridge, installing a virtual network interface card (VNIC) to couple each VM to the software bridge, wherein the VNIC enables a respective VM to access the software bridge.

4. The method of claim 3, further comprising causing a VNIC associated with each of the VMs to be coupled to the software bridge as a bridge interface.

5. The method of claim 4, wherein the software bridge is configured to allow the VMs to communicate with each other via their respective VNICs.

6. The method of claim 5, wherein the remote host is a virtual desktop server (VDS) of a graphics remoting system and the management server is a virtual desktop control server (VDC) associated with the graphics remoting system.

7. A computer-readable storage medium including instructions that, when executed by a processing system, cause the processing system to perform a method, the method comprising:
   configuring, at a management server hostn, a logical network to be associated with a network interface card (NIC) of a remote host, wherein configuring the logical network comprises assigning a network identifier to the logical network;

upon configuring the logical network, installing, by the management server, a software bridge within the remote host;

assigning, by the management server, to the software bridge a bridge identifier that is identical to the network identifier; and causing a plurality of virtual machines (VMs) hosted by the remote host to be communicatively coupled to the software bridge to access the logical network via the NIC of the remote host.

8. The computer-readable storage medium of claim 7, wherein the NIC of the remote host is coupled to the software bridge as a bridge interface, wherein the NIC is a physical network interface device.

9. The computer-readable storage medium of claim 8, wherein the method further comprises for each of the VMs coupled to the software bridge, installing a virtual network interface card (VNIC) to couple each VM to the software bridge, wherein the VNIC enables a respective VM to access the software bridge.

10. The computer-readable storage medium of claim 9, wherein the method further comprises causing a VNIC associated with each of the VMs to be coupled to the software bridge as a bridge interface.

11. The computer-readable storage medium of claim 10, wherein the software bridge is configured to allow the VMs to communicate with each other via their respective VNICs.

12. The computer-readable storage medium of claim 11, wherein the remote host is a virtual desktop server (VDS) of a graphics remoting system and the management server is a virtual desktop control server (VDC) associated with the graphics remoting system.

13. A system, comprising:

a network configuring unit to configure a logical network to be associated with a network interface card (NIC) of a remote host, the network configuring unit to assign a network identifier to the logical network; and a remote installation unit coupled to the network configuration unit to install a software bridge within the remote host, to assign to the software bridge a bridge identifier that is identical to the network identifier, and to cause a plurality of virtual machines (VMs) hosted by the remote host to be communicatively coupled to the software bridge to access the logical network via the NIC of the remote host.

14. The system of claim 13, wherein the NIC of the remote host is coupled to the software bridge as a bridge interface, wherein the NIC is a physical network interface device.

15. The system of claim 14, wherein for each of the VMs coupled to the software bridge, the remote installation unit is configured to install a virtual network interface card (VNIC) to couple each VM to the software bridge, wherein the VNIC enables a respective VM to access the software bridge.

16. The system of claim 15, wherein the remote installation unit is configured to cause a VNIC associated with each of the VMs to be coupled to the software bridge as a bridge interface.

17. The system of claim 16, wherein the software bridge is configured to allow the VMs to communicate with each other via their respective VNICs.

18. The system of claim 17, wherein the remote host is a virtual desktop server (VDS) of a graphics remoting system and the management server is a virtual desktop control server (VDC) associated with the graphics remoting system.

* * * * *